United States Patent [19]
Solomon et al.

[11] Patent Number: 5,261,074
[45] Date of Patent: Nov. 9, 1993

[54] COMPUTER WRITE-INITIATED SPECIAL TRANSFER OPERATION

[75] Inventors: Douglas E. Solomon, Sunnyvale; Thomas A. Jermoluk, Los Altos, both of Calif.

[73] Assignee: Silicon Graphics, Inc., Mountain View, Calif.

[21] Appl. No.: 869,821

[22] Filed: Apr. 15, 1992

Related U.S. Application Data

[63] Continuation of Ser. No. 253,206, Oct. 3, 1988, abandoned.

[51] Int. Cl.$^5$ .................................. G06F 13/36
[52] U.S. Cl. ..................... 395/425; 395/400; 395/650; 364/942.8; 364/955.1; 364/957.5; 364/963.1; 364/960.1
[58] Field of Search ................ 395/650, 700, 425

[56] References Cited

U.S. PATENT DOCUMENTS

| | | | |
|---|---|---|---|
| 4,209,841 | 6/1980 | Bambara et al. | 364/200 |
| 4,296,476 | 10/1981 | Mayer et al. | 364/900 |
| 4,346,439 | 8/1982 | Huno et al. | 364/200 |
| 4,394,733 | 7/1983 | Swenson | 364/200 |
| 4,399,503 | 8/1983 | Hawley | 395/425 |
| 4,415,971 | 11/1983 | Guillemet et al. | 364/200 |
| 4,426,679 | 1/1984 | Yu et al. | 364/200 |
| 4,729,095 | 3/1988 | Colley et al. | 364/200 |
| 4,797,814 | 1/1989 | Brenza | 395/425 |

*Primary Examiner*—Gareth D. Shaw
*Assistant Examiner*—John Q. Chavis
*Attorney, Agent, or Firm*—Blakely, Sokoloff, Taylor & Zafman

[57] ABSTRACT

A method for performing a transfer of digital information. A starting address is sent from a central processing unit of a digital computer to a bus, to a memory, and to a subsystem. A word count is sent from the central processing unit to a bus and to a subsystem. A block of data having a starting address that is the address of a first word in the block of data and having a word count that represents the number of words in the block of data is sent directly from the memory to the subsystem via the bus.

6 Claims, 3 Drawing Sheets

COMPUTER WRITE-INITIATED SPECIAL TRANSFEROPERATION

This is a continuation of application Ser. No. 07/253,206, filed Oct. 3, 1988, now abandoned.

FIELD OF THE INVENTION

The present invention pertains to the field of providing for efficient transfers of digital information within a digital computer. More particularly, this invention relates to a transfer of digital information from a central processing unit to a bus, from a memory to a bus, and from a bus to a subsystem, including a graphics subsystem.

BACKGROUND OF THE INVENTION

Digital computers have employed methods and systems for transferring digital information from memory to various subsystems of the computers, including graphics subsystems. Graphics subsystems control, in part, the graphical display on a computer work station or terminal.

In one prior art configuration, graphical information was first down-loaded into a section of main memory (i.e., host memory) of the computer. The prior art computer had a special-purpose display list processor in addition to a host processor. The computer also had a special-purpose display list memory in addition to the host memory. The display list processor would then transfer the graphical information from the host memory to the display list memory. The display list processor would then send the graphical information from the display list memory to the graphics subsystem by continually traversing the display list.

One disadvantage with this prior art configuration was that it involved two transfers of data—one transfer from the host memory to the display list memory and another transfer from the display list memory to the graphics subsystem—rather than one transfer. This accordingly imposed a performance penalty.

Another disadvantage with this prior art configuration was that it involved extra hardware beyond the host processor and the host memory—namely, the display list processor and the display list memory.

In another prior art configuration, there was no special purpose display list processor and no special purpose display list memory. Instead, the graphical information was stored in the main (i.e., host) memory, and transferred from the main memory to the graphics subsystem by the host processor. The host processor thus took the place of the list processor.

One disadvantage with this latter prior art configuration was that a large portion of the processor's time was devoted to doing these transfers of graphical information from the memory to the graphics subsystem. This delayed the processor from doing other operations. Another disadvantage was that the processor could not keep up with the speed at which the graphics subsystem could receive the data. In other words, the transfers were not as fast as they could be.

SUMMARY AND OBJECTS OF THE INVENTION

In view of the limitations of known methods and systems for transferring digital information from a computer memory to a subsystem of a computer, including a graphics subsystem, one of the objectives of the present invention is to provide efficient means for transferring data to a subsystem of a computer, including a graphics subsystem, in order to enhance the performance of the computer.

Another objective of the present invention is to provide a method and apparatus for transferring digital information to a subsystem of a computer under control of a central processing unit ("CPU") that minimizes the amount of time the CPU is involved in the transfer and thus frees the CPU to be involved in other computer operations. It is therefore an objective of the present invention to avoid having the transfer dominate a CPU's processing time.

An additional objective of the present invention is to provide a method and apparatus for transferring digital information to a subsystem of a computer that minimizes the amount of computer hardware necessary to provide for such transfers.

Another objective of the present invention is to provide a method and apparatus for transferring digital information to a subsystem of a computer at a sufficiently high rate of speed such that the speed at which the computer sends the digital information to the subsystem substantially matches the maximum speed at which the subsystem is capable of receiving the digital information.

Another objective of the present invention is to provide a method and apparatus for transferring digital information to a subsystem of a computer wherein two or more data words are transferred at a time.

Another objective of the present invention is to provide a method and apparatus for transferring digital information to a subsystem of a cache-based multiprocessor computer, wherein data transfers can cross a cache line.

A further objective of the present invention is to provide a method and apparatus for transferring digital information to a subsystem of a computer such that if an interrupt occurs during a transfer, after the interrupt the computer can be restored to the state the computer was in just prior to the interrupt.

These and other objects of the invention are provided for by a method and apparatus for performing a three-way transfer of digital information within a digital computer. The digital computer includes a CPU, decoding circuitry coupled to the CPU, a bus coupled to the decoding circuitry, a memory coupled to the bus, and a subsystem coupled to the bus. The digital information includes a block of data having (1) a starting address that is the address of a first word in the block of data and (2) a word count that represents the number of words in the block of data. A trigger address for a write operation is sent from the CPU to the decoding circuitry. The trigger address is decoded and subsequent write operations are inhibited from modifying the memory. The starting address for a write operation is sent from the CPU to the bus. The starting address is then sent from the bus to the memory and to the subsystem. The data comprising the word count is sent from the CPU to the bus. A sequence of two or more data words is sent from the memory to the bus. The number of data words in the sequence is greater than or equal to the word count. One of the data words of the sequence of data words resides in the memory at the starting address location. The sequence of data words is transferred from the bus to the subsystem. The block of data is thus transferred directly from the memory to the subsystem via the bus.

The above-mentioned objects and other objects of the invention are also provided for by a method and apparatus for performing a three-way transfer of digital information within a digital computer. The digital computer includes a CPU, decoding circuitry coupled to the CPU, a bus coupled to the decoding circuitry, a memory coupled to the bus, and a subsystem coupled to the bus. The digital information includes a block of data having (1) a first starting address that is the address of a first word in the block of data, (2) an ending address that is the address of a last word in the block of data, and (3) a word count that represents the number of words in the block of data. A trigger address for a write operation is sent from the CPU to the decoding circuitry. The trigger address is decoded and subsequent write operations are inhibited from modifying the memory. A first starting address for a write operation is sent from the CPU to the decoding circuitry. A bit of the first starting address is saved as a tag bit. The tag bit has an order that represents the position of the tag bit within the starting address. The first starting address is sent from the decoding circuitry to the bus. The first starting address is sent from the bus to the memory and to the subsystem. The data comprising the word count is sent from the bus to the subsystem. A first sequence of N data words is sent from the memory to the bus. N is an integer greater than one and greater than or equal to the word count. One of the data words of the first sequence of N data words resides in the memory at the first starting address location. The first sequence of N data words is transferred from the bus to the subsystem. The word count is divided by N, one is subtracted, and, if there is any fraction in the result, the result is rounded to the next greatest integer to produce an integer X. If X is a positive integer other than zero, then the above steps are repeated X times. Before each repetition of the above steps, (1) the first starting address is incremented by N to produce a second starting address, (2) the first starting address becomes the second starting address, (3) the tag bit is cleared, and (4) the first sequence of N data words becomes a next sequence of N data words out of a successive series of sequences of N data words, the successive series being run through as the above steps are repeated X times. After the above steps are completed, the ending address for a write operation is sent from the CPU to the decoding circuitry. The tag bit is compared with a bit of the ending address having the same order as the tag bit. If the two bits are not the same, then (1) the ending address is sent from the decoding circuitry to the bus, (2) the ending address is sent from the bus to the memory and to the subsystem, (3) the data comprising the word count is sent from the CPU to bus, (4) the data comprising the word count is sent from the bus to the subsystem, (5) an ending sequence of N data words is sent from the memory to the bus, wherein one of the data words of the ending sequence of data words resides in the memory at the ending address location, and (6) the ending sequence of N data words is transferred from the bus to the subsystem. The block of data is thus transferred directly from the memory to the subsystem via the bus.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
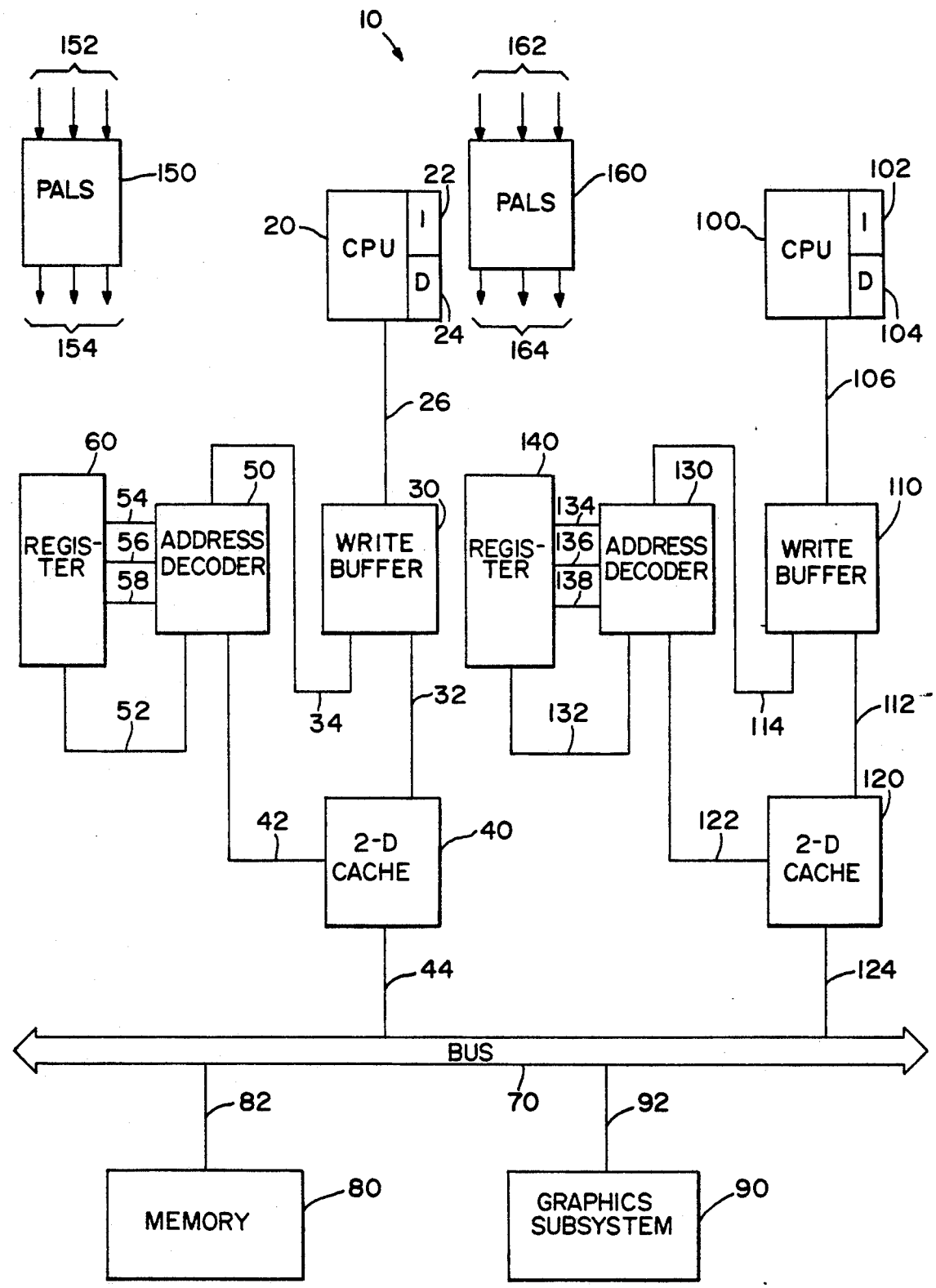
FIG. 1 is a block diagram of the architecture of a digital computer that includes two CPUs, decoding circuitry, a bus, a memory, and a graphics subsystem.

With reference to the drawings, FIG. 1 illustrates in block diagram form circuitry 10 forming the architecture of a cache-based multiprocessor digital computer with enhanced graphics capabilities. Starting with the left side of FIG. 1, CPU 20 is a 32 bit R3000 reduced instruction set computer ("RISC") microprocessor sold by MIPs Computers of Sunnyvale, Calif. Each data word is comprised of 32 bits. Instruction cache 22 is coupled to CPU 20, and data cache 24 is likewise coupled to CPU 20. Instruction cache 22 and data cache 24 act as small high-speed memories placed between processor 20 and main memory 80. Instruction cache 22 and data cache 24 are each direct mapped. The fact that caches 22 and 24 are direct mapped means that CPU 20 knows where from main memory 80 the data in caches 22 and 24 came from. The dual cache scheme ensures that instructions and data will not compete for the same cache locations in the direct mapped implementation. Separate instruction and data caches provide for increased instruction bandwidth. Circuitry 10 also includes a second direct-mapped data cache 40 coupled between write buffer 30 and bus 70.

A graphics subroutine resides in instruction cache 22 and data cache 24 of CPU 20, and also in the instruction cache 102 and data cache 104 of CPU 100.

In a preferred embodiment of the present invention, a three-way transfer of digital information within circuitry 10 is performed. In one transfer of the three-way transfer operation, a starting address is sent from CPU 20 to memory 80 via bus 70. As another transfer of the three-way transfer operation, the starting address is sent from CPU 20 to graphics subsystem 90 via bus 70. In a third transfer of the three-way transfer operation, a block of data having a starting address that is the address of a first word in the block of data and having a word count that represents the number of words in the block of data is sent directly from memory 80 or data cache 40 to graphics subsystem 90 via bus 70. Graphics subsystem 90 uses the block of data so transferred.

Data cache 24 is a write-through cache. For a write-through cache, such as data cache 24, CPU 20 always writes to both the data cache (i.e., data cache 24) and main memory 80. Data cache 24 is write-through so that main memory 80 always has the latest copy of any data residing in data cache 24. In a write-through cache architecture, one always pretends one has missed the cache, and thus CPU 20 writes to both the cache (i.e., cache 24) and to memory 80. The tag to cache 40 is also updated.

Second level data cache 40 is a write-back cache, however. A write-back cache scheme means that it is possible that cache 40 has a more recent version of a data word than the one that resides at the same address location in memory 80. In a write-back cache scheme, CPU 20 writes to cache 40 only and does not write to both cache 40 and memory 80 at the same time. In other words, a write-back cache scheme means that cache 40 can have more up-to-date information than memory 80. Thus, it is possible that cache 40 could have an exclusive copy of a recently modified data word. The write-back cache scheme minimizes bus traffic because if CPU 20 wants to write to the same location twice, CPU 20 would only need to write to memory 80 once.

Write buffer 30 is a four-deep write buffer, which means that write buffer 30 can hold four words of digital information. Write buffer 30 is also a first-in-first-out ("FIFO") write buffer. Writer buffer 30 is coupled to second level data cache 40 via lines 32. Write buffer 30 is also coupled to address decoder 50 via lines 34.

Write buffer 30 is coupled to CPU 20 and data cache 24 via lines 26. Write buffer 30 keeps write-through cache 24 from having to wait for slower main memory 80 to complete its write cycles. CPU 20 dumps the digital information it wishes to write (to second level data cache 40 or memory 80) into write-buffer 30. Write buffer 30 then does the relatively slow writes to second level data cache 40 and main memory 80 while CPU 20 moves on to other computer operations. In a preferred embodiment of the present invention, CPU 20 is a 25 MHz microprocessor which transfers digital information relatively quickly. Write buffer 30 thus acts to capture the digital information from CPU 20 to allow CPU 20 to move on to other computer operations.

CPU 20 performs read or write operations. In a read operation (i.e., a load operation), CPU 20 gets instructions, addresses, and data from caches 22, 24, and 40, or memory 80. If CPU 20 "misses" a cache during a read operation, that means CPU 20 goes to memory 80 to get instructions, addresses, and data rather than going to caches 22, 24, or 40. During a read operation, CPU 20 must wait for data. During a write operation (i.e. a store operation), CPU 20 sends addresses and data to caches 24 and 40, or memory 80. If CPU 20 "misses" caches 24 or 40 during a write operation, then cache 22 sends addresses and data to both caches 24 and 40.

CPU 20 sends out and receives addresses and data on lines 26. Write buffer 30 sends out and receives addresses and data on lines 32. Second level data cache 40 sends out and receives addresses and data on lines 44.

Referring to the right side of FIG. 1, CPU 100 is also a 32 bit R3000 RISC microprocessor sold by MIPs computers of Sunnyvale, Calif. The circuitry on the right side of FIG. 1 is similar to the circuitry on the left side of FIG. 1. Instruction cache 102 is coupled to CPU 100. Data cache 104 is also coupled to CPU 100. Instruction cache 102 and data cache 104 are both direct-mapped. Data cache 104 is a write-through data cache. CPU 100 sends addresses and data to write buffer 110 via lines 106. Write buffer 110 is likewise a FIFO four-deep write buffer. Write buffer 110 sends addresses and data to second-level data cache 120 via lines 112. Write buffer 110 is also coupled to address decoder 130 via lines 114. Second level data cache 120 is a direct-mapped write-back data cache. Second level data cache 120 sends addresses and data to bus 70 via lines 124. Second level data cache 120 is also coupled to address decoder via lines 122.

Referring to the lower portion in FIG. 1 addresses and data pass between memory 80 and bus 70 via lines 82. Addresses and data pass between graphics subsystem 90 and bus 70 via lines 92.

In an alternative embodiment of the present invention, additional processors sharing bus 70, memory 80 and graphics subsystem 90 could be provided. For example, four microprocessors, rather than two microprocessors, could share bus 70.

Moreover, in another alternative embodiment of the present invention, a single processor rather than multiple processors would be coupled to bus 70. In such an alternative embodiment, CPU 20 and the circuitry on the left side and lower portion of FIG. 1 would be part of the circuitry. CPU 100 would not be part of the circuitry.

In yet another alternative embodiment of the present invention, the circuitry of the invention would not include any write buffers or second-level data caches. In other words, write buffers 30 and 110 and data caches 40 and 120 would not be included. The digital computer would, however, include a CPU, decoding circuitry coupled to the CPU, a bus coupled to the decoding circuitry, a memory coupled to the bus, and a subsystem coupled to the bus.

Returning to the preferred embodiment of FIG. 1, given that circuitry 10 contains multiple data caches, there must be a scheme for maintaining cache consistency or cache coherency protocol. Cache consistency of cache coherency ensures that when CPU 20 writes to data cache 40, CPU 100 can access that same data that has been written into cache 40.

Two state bits are used as part of the cache coherency scheme of the preferred embodiment of the present invention. The two state bits can show four possible states:
 (1) a valid state,
 (2) an invalid state,
 (3) a shared state, and
 (4) a dirty state.

In a preferred embodiment of the present invention, the state bits are associated with lines of data. In a preferred embodiment, a line of data is comprised of four data words lying between two consecutive cache lines. A modification of any data word of the data words comprising the data line means that the data line has been modified.

The valid state indicates that the particular data line from memory is only in one data cache and that data line has not been modified. In other words, the unmodified data line is the same in both memory and in the data cache. For example, the unmodified data line would appear in both data cache 40 and memory 80.

The invalid state is equivalent to no data being in the cache. The cache is thus initialized to the invalid state. The invalid state is equivalent to a "miss."

The shared state indicates that the particular data line is possibly in more than one cache and has not been modified yet. For example, the data line could be in both data cache 40 and data cache 120.

The dirty state indicates that there is only one copy of the particular data line, that this is the most current copy, that this is the only cache with this particular data, and that memory 80 does not contain that data. In other words, if the state bits associated with cache 40 are set to show the dirty state, that means that cache 40 has an exclusive copy of that particular line of data. That means that the line of data is not found in any other data cache of circuitry 10 or in memory 80. Thus, if the state bits show the dirty state for data cache 40, that means that data cache 120 does not have a copy of that particular line of data nor does memory 80 have a copy of that particular line of data.

Every operation involving bus 70 requires the participation of both data cache 40 and data cache 120 as well as memory 80. Thus, cache 40 and cache 120 each is a "snooping" cache in the sense that each looks at the address on bus 70.

An example of a sequence of cache states helps to explain the cache coherency protocol. Data cache 40 and data cache 120 are first initialized to the invalid state. Then data cache 40 goes to the valid state. After data cache 40 goes to the valid state, CPU 100 then wishes to read from main memory 80. Then both cache 40 and cache 120 go to the shared state.

Suppose, for example, that CPU 20 wishes to write to the same address in data cache 40. In other words, CPU 20 wishes to write to a shared line. CPU 20 will accordingly to a bus operation via bus 70 to tell data cache 120 to go from the shared state to the invalid state for that line. Thus, cache 120 goes to the invalid state. Data cache 40 then goes to the dirty state.

Thus, the dirty copy of that particular data cache line is in data cache 40 and not in data cache 120, and not in memory 80. If CPU 100 wishes to read that particular cache line that is dirty, the data would come from data cache 40 rather than from main memory 80. This is because data cache 40 contains the exclusive copy of that modified cache line. When CPU 100 reads that data, the data goes from cache 40 to cache 120 via bus 70. Then both data cache 40 and data cache 120 go back to the shared state.

If during a three-way transfer operation the cache coherency protocol state bits indicate that data cache 40, for example, has an exclusive copy of the data line to be transferred (i.e., cache 40 has a dirty copy), then the data cache line is transferred from cache 40 via bus 70 to graphics subsystem 90, rather than from memory 80. Similarly, if data cache 120 has an exclusive modified copy of the data to be transferred during a three-way transfer operation (i.e., data cache 120 has a dirty copy), then that data is transferred from data cache 120 to graphics subsystem 90 rather than from memory 80. The fact that the cache coherency protocol is taken into account during a three-way transfer operation ensures that only the most recently modified copies of data words will be transferred as part of a three-way transfer operation rather than outdated earlier copies of data words.

Bus 70 is a 64 bit bus. Bus 70 contains separate address and data lines. CPU 20 and CPU 100 can access but 70 at different times, and thus bus 70 is a multiplexed bus. The three-way transfer operation is a special bus operation.

In a preferred embodiment of the present invention, each cache transfer is a four-way word transfer. Thus, anytime there is a transfer involving bus 70, four data words are transferred per each address. Therefore, instead of a single data word being transferred for a single bus cycle, four data words are transferred for a single bus cycle. Thus, any transfer involving bus 70 transfers 128 bits, given that each data word is 32 bits long and four data words are transferred at a time. Anytime there is a single memory read or write operation, there also are four words transferred at a time. Four words are transferred at a time, whether or not CPU 20 needs four words or less than four words. For example, if CPU 20 needs three words rather than four words, CPU 20 would nevertheless receive four words given that less than four words are never transferred.

Figure 2:
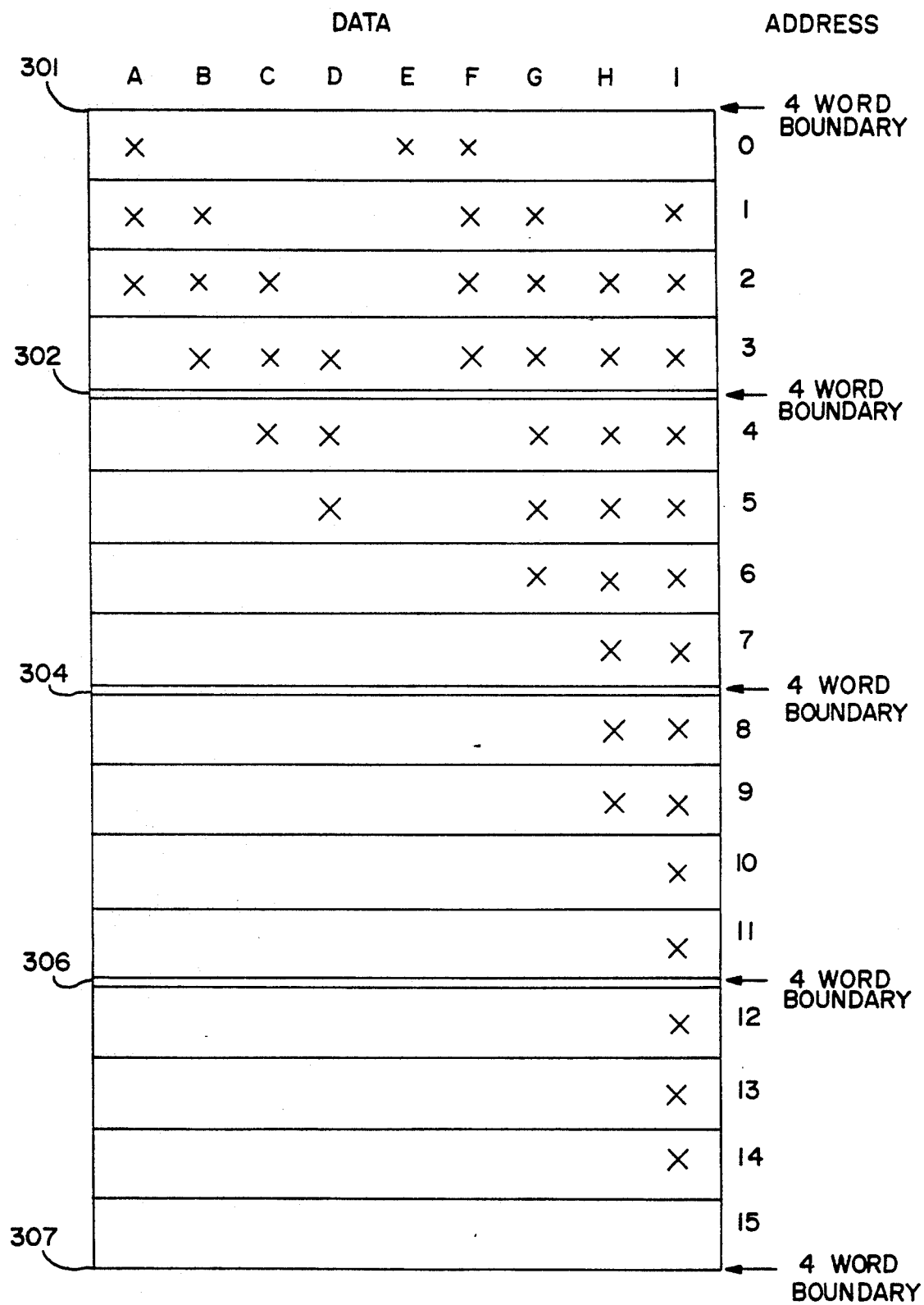
FIG. 2 illustrates blocks of data with various word counts.

Memory 80 and caches 22, 24 40, 102, 104 and 120 are organized into cache lines. Cache lines 301, 302, 304, 306, and 307 are illustrated in FIG. 2. Data is depicted under the column labeled "data," and addresses are depicted under the column labeled "address." Cache lines 301, 302, 304, 306, and 307 organize the data into groups of four data words. For example, four data words lie between cache line 302 and cache line 304. Thus, cache lines 301, 302, 304, 306, and 307 are each four-word boundaries.

As shown in FIG. 1, graphics subsystem 90 is coupled to bus 70 via lines 92. In a preferred embodiment of the present invention, graphics subsystem 90 handles the transforming, rendering, and displaying of graphical information for the digital computer. These operations are performed locally through the use of pipelined very large scale integration ("VLSI") processors, parallel finite-state processors, fast memory, and a 32-bit microprocessor (all not shown). Graphics subsystem 90 includes a geometry subsystem (not shown), a rendering subsystem (not shown), and a display subsystem (not shown). A graphics manager board (not shown) is part of the rendering subsystem, which in turn is part of the graphics subsystem 90. The graphics manager board includes a microprocessor (not shown) and a local memory (not shown). The processor of the graphics manager board communicates with microcompressors 20 and 100 of circuitry 10. The graphics manager of graphics subsystem 90 also supervises the activities of the geometry pipeline within graphics subsystem 90.

Address decoder 50 is coupled to write buffer 30 via lines 34. Address decoder 50 contains decoder circuitry that decodes addresses residing in write buffer 30. The information obtained from address decoder 50 is used to decide whether to request bus 70 or not. The information obtained from address decoder 50 is also used to decide whether to read, write, or perform a three-way transfer operation. The information obtained from address decoder 50 is also used to decide what to do with data cache 40.

Address decoder 50 sends signals to data cache 40 via lines 42. Address decoder sends out decode or status bits on lines 52 to register 60. The status or decode bits can be stored in register 60. The status or decode bits are also known as three-way transfer bits or simply three-way bits. Lines 54, 56, and 58 also couple register 60 to address decoder 50. Lines 54, 56, and 58 provide means for register 60 to send the state of the three-way transfer bits to register 50.

The three-way transfer bits include (1) a starting address trigger bit, (2) an ending address trigger bit, and (3) a tag bit. In a preferred embodiment of the present invention, the tag bit is the fifth order bit of the starting address associated with a three-way transfer operation. In other words, the tag bit is the A4 bit of the starting address.

The starting address trigger bit, the ending address trigger bit, and the tag bit can be sent via lines 52 from address decoder 50 to register 60 for storage. The bits stored in register 60 can also be cleared and thus reset. Address decoder 50 can also sample the bit of an ending address in write buffer 30 and send that bit to register 60 for storage via lines 52. In a preferred embodiment of the present invention the fifth order bit of the ending address is so sampled and saved. In other words, the A4 bit of the ending address is sampled and saved.

The starting trigger bit supplied by address decoder 50 is used to inhibit further writes during a three-way transfer operation. The starting address trigger bit also indicates that the next write operation will be a write to the starting address. Address decoder 50 produces an ending address trigger bit once there is a write to the starting address. The ending address trigger bit indicates that the next write operation will be a write to the ending address.

Address decoder 130 and register 140 on the right side of FIG. 1 perform similar functions as address decoder 50 and register 60, respectively. Address decoder 130 decodes addresses sent from write buffer 110 via lines 114. Address decoder 130 sends control signals to data cache 120 via lines 122. Address decoder 130 sends three-way bits (i.e., decode or status bits) to register 140 for storage via lines 132. The three-way bits include a starting address trigger bit, an ending address trigger bit, a tag bit, and a bit of the ending address having the same order as the tag bit. Register 140 can be cleared, thus resetting the three-way bits stored in register 140. Register 140 is coupled to address decoder 130 via lines 134, 136, and 138. Thus, the contents of register 140 can be sent to address decoder 130 via lines 134, 136, and 138.

Programmable array logic devices ("PALs") 150 contain control logic for circuitry 10 of the digital computer. PALs 150 receive inputs via lines 152. PALs 150 send out control signals via lines 154. PALs 160 also contain control logic for circuitry 10. PALs 160 receive inputs via lines 162 and send out control signals via lines 164.

PALs 150 and 160 control all the cycles on bus 70. PALs 150 and 160 decide whether bus 70 is requested or not. PALs 150 and 160 also ultimately decide whether a read/write operation is to occur or a three-way transfer operation is to occur. PALs 150 and 160 oversee the three-way transfer operation. PALs 150 and 160 decide whether a write operation is to be inhibited during a three-way transfer operation. PALs 150 and 160 monitor the status of the three-way bits in registers 60 and 140 and thus receive the three-way bits in order to make control decisions. PALs 150 and 160 make sure that the three-way bits are either saved, restored, or cleared, depending on whether there is an interrupt and depending on what stage circuitry 10 is in during a three-way transfer operation. PALs 150 and 160 send control signals to transceivers (not shown) that control the direction of flow of addresses and data throughout much of circuitry 10.

In a preferred embodiment of the present invention, PALs 150 and 160 are comprised of flip-flops, state machines, and logic gates. In an alternative embodiment of the present invention, the control provided PALs 150 and 160 could be microcoded. The logic used in programming or microcoding PALs 150 and 160 follows from the methods described here for performing three-way transfers of digital information.

The three-way transfer operation of the present invention provides an efficient means for transferring data to the graphics manager board (not shown) of graphics subsystem 90.

In a preferred embodiment of the present invention, the displaying of graphical images on a display of a digital computer involves polygon tiling. Polygon tiling means that images are comprised of a plurality of relatively small polygons. The coordinates of each such polygon must be sent to the graphics subsystem 90 from bus 70, so that the graphics pipeline of graphics subsystem 90 can receive such coordinates. Associated with each vertex of each polygon are X, Y and Z spatial components and R, G, B (i.e., red, green, blue) color codes. Thus, each vertex of each polygon has an X word, a Y word, a Z word, a R word, a G word, and a B word, and those words must be sent to graphics subsystem 90 via bus 70. Each of said words are floating point numbers. Given that six words are associated with each vertex, and that there are usually four vertices per polygon, there are thus twenty-four words per polygon. In view of the fact that each image displayed is made up of a number of polygons, a relatively large number of data words must be sent to graphics subsystem 90. Moreover, such words must be sent to the graphics subsystem 90 at a sufficiently fast rate in order to optimize the performance of graphics subsystem 90.

During a three-way transfer operation, a block of data is transferred from either (1) main memory 80 or (2) cache 40 or cache 120 (if cache 40 or cache 120 has an exclusive modified copy of the data) to graphics subsystem 90 via bus 70. The block of data that is transferred has (1) a starting address that is the address of a first word in the block of data (2) an ending address that is the address of a last word in the block of data, and (3) a word count that represents the number of words in the block of data.

FIG. 2 illustrates examples of blocks of data that can be transferred as part of a three-way transfer operation. Each "X" of FIG. 2 illustrates a word of a block of data to be transferred over bus 70. As discussed above, memory 80 as well as caches 40 and 120 are organized by cache lines, such as cache lines 301, 302, 304, 306, and 307 of FIG. 2. The cache lines organize the data words into groups of four. Anytime there is a bus operation or data transfer involving the bus four words are transferred at a time.

As seen in FIG. 2, the blocks of data to be transferred as part of a three-way transfer operation can have various word lengths. The blocks of data can also have different starting addresses and different ending addresses. For example, the block of data under column A of FIG. 2 has a word count of three, a starting address of zero, and an ending address of two. In addition, the column A block of data does not cross a cache line.

The block of data under column B has a starting address of one, an ending address of three, and a word count of three.

To transfer any data over bus 70, one must transfer four words at a time. Therefore, to transfer the block of data of column A over bus 70, the sequence of data words from address zero through address three must be transferred. Therefore, even through CPU 20 of FIG. 1 only wishes to transfer the column A block of data starting at address zero and ending at address two, nevertheless the data residing at address three is also transferred. Thus, in the cache line architecture of circuitry 10, extra data is sometimes transferred as part of any three-way transfer operation. Correspondingly, if CPU 20 wishes to transfer the block of data under column B of FIG. 2, the data at address zero is transferred along with the block of data that has a starting address of one, an ending address of three, and a word count of three.

Thus, if the block of data that CPU 20 wishes to transfer resides entirely within a sequence of four data words bordered by two cache lines, then CPU 20 cannot specify which particular words in that four word sequence CPU 20 wishes to transfer. Instead, CPU 20 gets all four words whether CPU 20 wants them or not. Another way to put this is that the lower order bits of an address are irrelevant if those lower order bits only specify where within a sequence of data words the particular data word resides. In other words, CPU 20 cannot get a single word within the four-word cache line grouping without getting the other words of the cache line grouping. The four words of a cache line grouping are also referred to collectively as a data line or a line of data.

Under column C of FIG. 2 is a data word with a starting address of two, an ending address of four, and a word count of three. This column C block of data crosses cache line 302. A single transfer of data over bus 70, however, only transfers the sequence of four data words that are between two consecutive lines. Therefore, a single bus transfer operation for column C would transfer the sequence of four data words starting at address zero and ending at address three. The data of the column C block of data residing at address four would not be transferred as a part of the first single bus transfer operation. This is because only the data residing between cache lines 301 and 302 would be transferred as part of a single bus transfer operation. The CPU would have to initiate another bus transfer operation to transfer the data at address four. Of course, as part of the second bus transfer operation, not only would data at address four be transferred, but also the data at addresses five, six, and seven, because that data resides between cache lines 302 and 304.

Similarly, two bus transfer operations, such as two three-way transfer operations, would be necessary to transfer the block of data under column D that has a starting address of three, an ending address of five, and a word count of three. During the first bus transfer operation, data words residing at addresses zero, one, two, and three would be transferred. During the second bus transfer operation, the data words at addresses four, five, six, and seven would be transferred, given that those data words reside between consecutive cache lines 302 and 304. Therefore, during a three-way transfer operation, even though a block of data is to be sent to graphics subsystem 90, nevertheless a sequence of four data words is sent to graphics subsystem 90 during each single transfer.

Column E of FIG. 2 illustrates that a block of data to be transferred as part of a three-way transfer operation can have a word count of one. Column F of FIG. 2 shows that a block of data to be transferred as part of a three-way transfer operation can have a word count of four. The transfers for columns A, B, E, and F would each require only a single transfer of a line of data as part of a three-way transfer operation. The blocks of data under columns E and D, which cross cache line 302, would, however, require two bus transfers as part of a three-way transfer operation. Transferring the Column E block of data would also mean that the data at addresses one, two, and three would be transferred as well as the data at address zero.

The block of data under column G has a word count of six, a starting address of one, and a ending address of six. The column G data also crosses cache line 302. Two bus transfers would accordingly be required to transfer the entire column G block of data.

Column H of FIG. 2 illustrates a block of data that crosses two cache lines, namely cache lines 302 and 304. The block of data under column H has a word count of eight, a starting address of two, and an ending address of nine. Three bus transfers as part of a three-way transfer operation would be required to fully transfer the block of data of column H. Again, the extra data at addresses zero, one, ten and eleven would also be transferred as part of the bus transfers.

The block of data under column 1 of FIG. 2. crosses three cache lines, namely cache lines 302, 304, and 306. The column 1 block of data has a starting address of one, a word count of fourteen, and an ending address of fourteen. Four bus transfers would be required to transfer the column 1 block of data in its entirety. Again, the data at addresses zero and fifteen would also be transferred as part of the bus transfers.

It is to be appreciated that according to the present invention, other blocks of data having other starting addresses, other ending addresses, and other word counts can be transferred. For example, one might wish to send blocks of data with word counts greater than four when one is sending double precision numbers.

Figure 3:
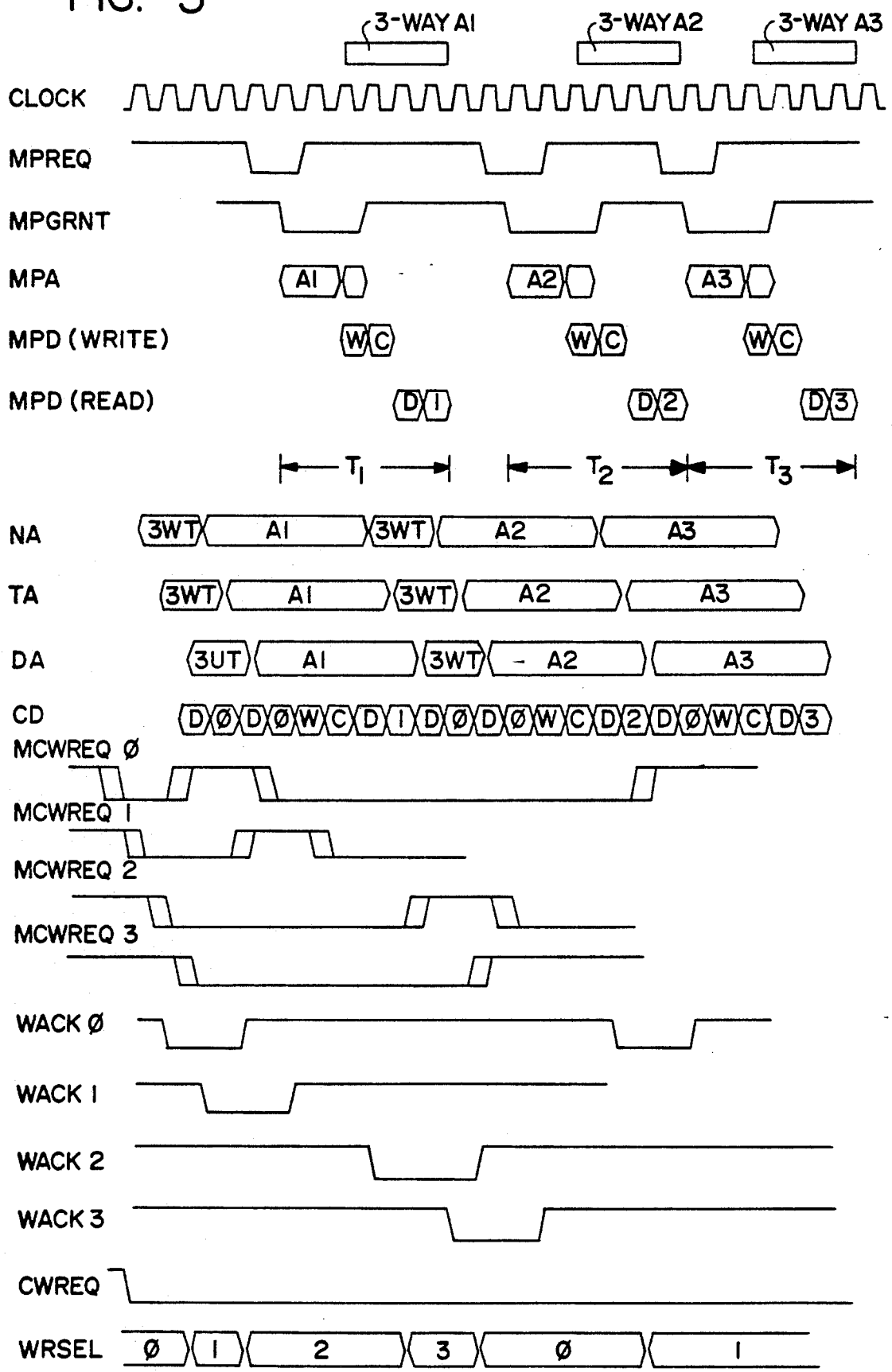
FIG. 3 is a timing diagram for a three-way transfer of digital information.

FIG. 3 is a timing diagram that illustrates the sequence of events which occur during a three-way transfer operation. The clock signals are illustrated near the top of FIG. 3. In a preferred embodiment of the present invention, a cycle time is defined as the length of time between one rising edge of the clock and the next rising edge of the clock.

Line NA of FIG. 3 is the "next address" line. Line NA of FIG. 3 depicts the addresses coming out of write buffer 30 on lines 34 and 32. Said addresses originated with CPU 20 and were sent to write buffer 30 via lines 26.

Line TA of FIG. 3 illustrates the tag addresses as they appear inside second-level data cache 40. Said tag addresses originated with CPU 20. The addresses appearing on line TA are simply delayed from those appearing on line NA.

Line DA of FIG. 3 depicts the data addresses for second-level data cache 40 as they appear inside data cache 40. The addresses shown on line DA are simply delayed versions of the addresses on lines TA and NA.

Line CD illustrates the data appearing on lines 32 from write buffer 30. Said data originated with CPU 20 and was sent to write buffer 30 via lines 26.

Line NA could alternatively depict the next addresses coming out of write buffer 110 on lines 114 and 112 and originating from CPU 100. Line TA could alternatively depict the tag addresses for data cache 120. Line DA could alternatively depict the data addresses for data cache 120. Line CD could alternatively depict the data appearing on lines 112 from write buffer 110 and originating from CPU 100.

As shown by FIG. 3, CPU 20 initiates a three-way transfer operation by performing a write to a three-way trigger address. In FIG. 3, "3WT" represents the three-way trigger address. This is the first address on line NA. The three-way trigger address is sent by CPU 20 to write buffer 30 via lines 26. Write buffer 30, lines 34, and address decoder 50 comprise the decoding circuitry that then decodes the trigger address sent to write buffer 30. Address decoder 50 decodes the three-way trigger address in order to set a starting address trigger bit that indicates that the next write operation by CPU 20 will be a write to a starting address of a block of data to be transferred during the three-way transfer operation. The setting of the starting address trigger bit by the address decoder 50 also serves to inform the second level data cache 40 that the next two write operations will be "special." Address decoder 50 sends a signal so indicating to second level data cache 40 via lines 42 which are coupled between address decoder 50 and second level data cache 40. The starting address trigger bit is saved by sending it from the address decoder via lines 52 to be stored in register 60.

The next two writes will be "special" writes. Both writes are inhibited from writing to second-level data cache 40. Both writes are also inhibited from modifying physical memory 80. The next two writes are also partial writes. In a preferred embodiment of the present invention, the next two partial writes will automatically invalidate data cache 24. This is because data cache 24 is set up to be invalidated if a partial write to data cache 24 is attempted. The fact that the next two writes are partial writes also means that the lower bytes of data containing a graphics command and a word count are eventually transferred to bus 70.

The three-way transfer operation can involve three types of writes:
(1) a write to a trigger address,
(2) a write to an initial starting address and, for longer blocks of data, one or more writes to other subsequent intermediate addresses, and
(3) a write to an ending address, but only if required.

For write operations and read operations, the data always follows an address. In other words, the address comes first in any transfer of digital information. After an address appears on line NA, data appears on line CD. The data depicted by D0 illustrated on line CD of FIG. 3 represents data not used. This is because processor 20 is doing a write to the trigger address, and thus we do not care about the data associated with the write to the trigger address.

Line MPREQ of FIG. 3 illustrates a multiprocessor bus request signal that runs from CPU 20 to bus 70. The MPGRNT line shown in FIG. 3 shows the multiprocessor bus grant line signal which runs from bus 70 to CPU 20 and also to CPU 100.

As shown on line NA of FIG. 3, the next signal to appear on lines 32 and 34 is starting address A1 for a write operation. When the first starting address for the write operation is encountered by second level data cache 40, multiprocessor bus 70 is requested and the multiprocessor bus three-way transfer operation is further carried out.

As soon as CPU 20 sees that the MPREQ and MPGRNT lines are driven low, CPU 20 will send the information appearing on line NA of FIG. 3 to multiprocessor bus 70. This is apparent from FIG. 3 given that line MPA represents the addresses appearing on multiprocessor bus 70 address lines. Thus, starting address A1 appears on line MPA after starting address A1 appears on next address line NA and after the signals MPREQ and MPGRNT are driven low. Prior to being received by multiprocessor bus 70, the starting address was sent from CPU 20 to write buffer 30 via lines 26. Address decoder 50 decodes the starting address, which is sent to address decoder 50 via lines 34. This results in the three-way starting address trigger bit being cleared and the three-way ending address trigger bit being set. The three-way starting address trigger bit is cleared by sending a clear signal to register 60. The three-way ending address trigger bit is set by address decoder 50, and sent via lines 52 to be stored in register 60. The ending address trigger bit is thus saved. The physical starting address contained in write buffer 30 is then placed on multiprocessor bus 70 address lines. This is depicted by A1 in line MPA of FIG. 3.

The word count and the graphics command are placed on the lower sixteen data lines of multiprocessor bus 70 during the period normally reserved for writeback data. The word count is depicted by "W" in line MPD (WRITE) of FIG. 3. The graphics command is represented by "C" in the MPD (WRITE) line of FIG. 3. Lines MPD (WRITE) and MPD (READ) together represent the data on the data lines of multiprocessor bus 70.

A graphics command tells the graphics subsystem what to do with the data that is being transferred as part of the three-way transfer operation. An example of a graphics command is the command "draw polygon." The graphics command comes from the software of the digital computer whose circuitry 10 is depicted in FIG. 1.

At the beginning of a clock cycle, data is put on bus 70. At the end of a clock cycle, graphics subsystem 90 latches the data, and thus the data is transferred to graphics subsystem 90 from bus 70 via lines 92. Therefore a settling time is provided for the data given that there is the gap in time between the beginning of the clock cycle and end of the clock cycle. By the time the word count and the graphics command reach multiprocessor bus 70, graphics subsystem 90 has already latched starting address A1.

A sixteen-byte line of data specified by the physical starting address A1 is placed on multiprocessor bus 70 by second-level cache 40 if and only if data cache 40 has the exclusive modified copy of the sixteen-byte line of data. The sixteen-byte line of data specified by the physical starting address is placed on the multiprocessor bus 70 by main memory 80 if main memory 80 has the most recent version of the sixteen-byte line of data and no other cache has an exclusive modified copy of the sixteen-byte line of data.

The graphics subsystem 90 then captures or latches the sixteen-byte line of data—i.e. the block of data—from multiprocessor bus 70. Thus, as part of a three-way transfer operation, the graphics subsystem 90 captures the multiprocessor bus starting address, the word count, the graphics command, and the sixteen-byte line of data—i.e., the block of data.

When a second write to a second address enters data cache 40, a second bus transfer will be initiated as part of the three-way bus transfer operation only if additional words not transferred during the first three-way transfer operation remain. This is determined by comparing the fifth order address bit (i.e., bit A4) of the second write address with the fifth order address bit (i.e., bit A4) saved from the first write address. If the bits are different, then an additional multiprocessor bus transfer operation will be performed as part of the three-way transfer operation as shown in FIG. 3.

The three-way ending trigger bit is cleared regardless of whether or not a subsequent three-way transfer operation is performed.

Referring to FIG. 3, lines MCWREQ0, MCWREQ1, MCWREQ2, and MCWREQ3 each correspond to a respective level of write buffer 30. When each of said lines is driven low, it indicates that the particular level of the write buffer is full of data.

Lines WACK0, WACK1, WACK2, and WACK3 are each handshaking signals associated with each level of write buffer 30.

Line CWREQ of FIG. 3 is simply a logical OR of all the MCWREQ lines 0-3. Thus, line CWREQ says that at least one write is pending. Line WBSEL of FIG. 3 tells you which level of write buffer 30 you are currently working with.

In one embodiment of the present invention, second, third, fourth, fifth, etc. write operations are performed as part of the three-way transfer operation if additional words not transferred during the prior transfers of the three-way transfer operation, remain. As shown in FIG. 3, T1 represents the time for the first write operation on bus 70 of the three-way transfer operation. Time T2 represents the second write operation on bus 70. Time T3 represents the ending write operation of the three-way transfer operation on bus 70. The performance of more write operations for longer blocks of data word would mean that there would be times T4, T5, T6, etc. until a block of data with a high word count was completely transferred to subsystem 90. For example, the block of data under column I of FIG. 2 would require four write operations, rather than the three operations shown in FIG. 3.

The last write operation of a three-way transfer always involves sending an ending address. Note in FIG. 3 that a trigger address is not sent between the next to the last write operation and the ending operation. A trigger address does appear on line NA of FIG. 3 between the first write operation of T1 and the second write operation of T2. If, for example, there were four write operations as part of the three-way transfer operation, then a write to a trigger address would occur between the second and third write operations, but not between the third and ending operations. This is because writing to a trigger address acts as a form of reset.

After the three-way transfer operation ends, future writes are allowed to occur.

In one embodiment of the present invention, a prior calculation is done to determine the number of writes that need to be done during a three-way transfer operation before the write to the ending address operation is done as part of the three-way transfer operation. The word count of the block of data to be transferred is divided by N, where N is the number of data words that reside between two adjacent cache lines. In other words, N is the number of data words transferred during any bus transfer operation. A one is then subtracted from the quotient. If the result after said substraction contains a fraction of a whole number, then the result is rounded to the next greatest integer. For example, if the result is 1.25, then the result is rounded to 2. This yields an integer X. Continuing with the previous example, the integer X would be 2. If X is a positive integer other than zero, then there will be X write operations following the first write operation and before the ending write operation of the three-way transfer operation. This calculation could be done by software in conjunction with PALs 150 and 160.

In alternative embodiments of the present invention, the number of data words transferred during each bus transfer operation could be N wherein N is an integer greater than one and greater than or equal to the word count. This means that N data words would lie between adjacent cache lines.

A CPU 20 exception and hence a context switch may occur between any one of the three writes associated with the three-way transfer of FIG. 3. Thus, in circuitry 10 of FIG. 1, the ability is provided to disable, save and restore the state caused by the first two writes. This ability is provided by saving (1) three-way starting address trigger bit, (2) three-way ending address trigger bit, and (3) a tag bit, which is the fifth order bit (i.e., bit A4) of the starting address. Those bits can be stored in register 60 of FIG. 1. The ability is also provided in circuitry 10 of FIG. 1 to read and write to the three bits in register 60. If an interrupt occurs during a three-way transfer operation, the operating system of the digital computer would first read and store the state of these three bits stored in register 60. The operating system would then disable the actual bits of register of 60. When the operating system goes back to restore the system where it was immediately before the interrupt, the operating system would restore the three bits to the state they were in immediately before the interrupt in register 60. The operating system could do so by first reading and storing the state of the three bits before they were disabled.

In alternative embodiments of the present invention, instead of writing to a graphics subsystem 90 as part of a three-way transfer operation, one could write to, for example, a serial port. In addition, one could write to a second memory instead of writing to graphics subsystem 90 as part of the three-way transfer operation.

In yet another alternative embodiment of the present invention, a block of data could be transferred directly from subsystem 90 to memory 80 via bus 70 as part of a three-way transfer operation.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather a restrictive sense.

What is claimed is:

1. In a digital computer that includes a central processing unit, decoding circuitry coupled to the central processing unit, a cache memory coupled to the decoding circuitry, a bus coupled to the cache memory, a main memory coupled to the bus, and a graphics subsystem coupled to the bus, a computer implemented method for performing a write-initiated special transfer operation of digital information, wherein the digital information is transferred to the graphics subsystem during the special transfer operation, wherein the digital information includes a starting address and a block of data, wherein (1) the starting address is an address of a first word in the block of data and (2) a word count represents the number of words in the block of data, comprising the steps of:

(a) initiating the special transfer operation by performing a first central processing unit write operation to send a trigger address from the central processing unit to the decoding circuitry, wherein the trigger address is written into the decoding circuitry during the first central processing unit write operation;

(b) decoding the trigger address by the decoding circuitry and inhibiting (1) a second central processing unit write operation subsequent to the first central processing unit write operation and (2) a third central processing unit write operation subsequent to the second central processing unit write operation from modifying the main memory and the cache memory;

(c) performing the second central processing unit write operation to send (1) the starting address and (2) data comprising the word count and a graphics command from the central processing unit to the cache memory and to the bus;

(d) sending the starting address from the bus to the main memory and to the graphics subsystem;

(e) sending the data comprising the word count and the graphics command from the bus to the main memory and to graphics subsystem;

(f) sending an exclusive modified version of a sequence of N data words directly from the cache memory to the graphics subsystem via the bus without sending the exclusive modified version of the sequence of N data words to the central processing unit that initiated the special transfer operation if the cache memory has the exclusive modified version of the sequence of N data words, wherein N is an integer greater than or equal to the word count, and wherein one of the data words of the sequence of N data words resides at the starting address, wherein the block of data is contained in the sequence of N data words;

(g) sending a most recent version of the sequence of N data words directly from the main memory to the graphics subsystem via the bus without sending the most recent version of the sequence of N data words to the central processing unit that initiated the special transfer operation if the main memory has the most recent version of the sequence of N data words and if the cache memory does not have the exclusive modified version of the sequence of N data words.

2. The method of claim 1, further comprising the steps of performing the third central processing unit write operation by sending an ending address from the central processing unit to the cache memory and to the bus, wherein the ending address is an address of a last word in the block of data;

sending the ending address from the bus to the main memory and to the graphics subsystem, wherein both the main memory and the cache memory are not modified during the third central processing unit write operation.

3. In a digital computer that includes a central processing unit, decoding circuitry coupled to the central processing unit, a cache memory coupled to the decoding circuitry, a bus coupled to the cache memory, a main memory coupled to the bus, and a graphics subsystem coupled to the bus, a computer implemented method for performing a write-initiated special transfer operation of digital information, wherein the digital information is transferred to the graphics subsystem during the special transfer operation, wherein the digital information includes a starting address and a block of data, wherein (1) the starting address is an address of a first word in the block of data, (2) an ending address is an address of a last word in the block of data, and (3) a word count represents the number of words in the block of data, comprising the steps of:

(a) initiating the special transfer operation by performing a first central processing unit write operation to send a trigger address from the central processing unit to the decoding circuitry, wherein the trigger address is written into the decoding circuitry during the first central processing unit write operation;

(b) decoding the trigger address by the decoding circuitry and inhibiting (1) a second central processing unit write operation subsequent to the first central processing unit write operation and (2) a third central processing unit write operation subsequent to the second central processing unit write operation from modifying the main memory and the cache memory;

(c) performing the second central processing unit write operation to send (1) the starting address from the central processing unit to the decoding circuitry and (2) data comprising the word count and a graphics command from the central processing unit to the cache memory and to the bus, wherein the step (c) further comprises (1) sending the starting address from the central processing unit to the decoding circuitry;

(2) saving a bit of the starting address as a tag bit, wherein the tag bit has an order that represents the position of the tag bit within the starting address;

(3) sending the starting address from the decoding circuitry to the cache memory and to the bus;

(4) sending the data comprising the word count and the graphics command from the central processing unit to the cache memory and to the bus:

(d) sending the starting address from the bus to the main memory and to the graphics subsystem;

(e) sending the data comprising the word count and the graphics command from the bus to the graphics subsystem;

(f) sending an exclusive modified version of a first sequence of N data words directly from the cache memory to the graphics subsystem via the bus without sending the exclusive modified version of the first sequence of N data words to the central processing unit that initiated the special transfer operation if the cache memory has the exclusive modified version of the first sequence of N data words, wherein N is an integer greater than one and less than or equal to the word count, and wherein one of the data words of the first sequence of N data words resides at the starting address;

(g) sending a most recent version of the first sequence of N data words directly from the main memory to the graphics subsystem via the bus without sending the most recent version of the first sequence of N data words to the central processing unit that initiated the special transfer operation if the main memory has the most recent version of the first sequence of N data words and if the cache memory does not have the exclusive modified version of the first sequence of N data words;

(h) performing the third central processing unit write operation to send the ending address from the central processing unit to the decoding circuitry:

(i) comparing the tag bit with a bit of the ending address having the same order as the tag bit, wherein the block of data is only contained in the first sequence of N data words if the tag bit is the same as the bit of the ending address, wherein the block of data is contained in the first sequence of N data words and a second sequence of N data words if the tag bit is not the same as the bit of the ending address, wherein if the two bits are not the same, then (1) sending the ending address from the decoding circuitry to the cache memory and to the bus;

(2) sending the ending address from the bus to the main memory and to the graphics subsystem;

(3) sending the data comprising the word count and the graphics command to the cache memory and to the bus from the central processing unit;

(4) sending the data comprising the word count and the graphics command from the bus to the graphics subsystem;

(5) sending an exclusive modified version of the second sequence of N data words directly from the cache memory to the graphics subsystem via the bus without sending the exclusive modified version of the second sequence of N data words to the central processing unit that initiated the special transfer operation if the cache memory has the exclusive modified version of the second sequence of N data words, wherein one of the data words of the second sequence of N data words resides at the ending address;

(6) sending a most recent version of the second sequence of N data words directly from the main memory to the graphics subsystem via the bus without sending the most recent version of the second sequence of N data words to the central processing unit that initiated the special transfer operation if the main memory has the most recent version of the second sequence of N data words and if the cache memory does not have the exclusive modified version of the second sequence of N data words.

4. In a digital computer that includes a central processing unit, decoding circuitry coupled to the central processing unit, a cache memory coupled to the decoding circuitry, a bus coupled to the cache memory, a main memory coupled to the bus, and a graphics subsystem coupled to the bus, a computer implemented method for performing a write-initiated special transfer operation of digital information, wherein the digital information is transferred to the graphic subsystem during the special transfer operation, wherein the digital information includes a starting address and a block of data, wherein (1) the starting address is an address of a first word in the block of data, (2) an ending address is an address of a last word in the block of data, and (3) a word count represents the number of words in the block data, comprising the steps of:

(a) initiating the special transfer operation by performing a first central processing unit write operation to send a trigger address from the central processing unit to the decoding circuitry, wherein the trigger address is written into the decoding circuitry during the first central processing unit write operation;

(b) decoding the trigger address in order to (1) set a starting address trigger bit that indicates that a second central processing unit write operation subsequent to the first central processing unit write operation will be a write to the starting address and (2) inhibit the second central processing unit write operation and a third central processing unit write operation subsequent to the second central processing unit write operation from modifying the main memory and the cache memory by using the starting address trigger bit;

(c) saving the starting address trigger bit;

(d) performing the second central processing unit write operation to send the starting address from the central processing unit to the decoding circuitry;

(e) decoding the starting address in order to (1) set an ending address trigger bit that indicates that the third central processing unit write operation will be a write to the ending address and (2) clear the starting address trigger bit, wherein the ending address trigger bit indicates that the third central processing unit write operation is inhibited from modifying the main memory and the cache memory;

(f) saving the ending address trigger bit by clearing the starting address trigger bit;

(g) saving a bit of the starting address as a tag bit, wherein the tag bit an order that represents the position of the tag bit within the starting address;

(h) sending the starting address from the decoding circuitry to the cache memory and to the bus;

(i) sending the starting address from the bus to the main memory and to the graphics subsystem;

(j) sending data comprising the word count and a graphics command to the cache memory and to the bus from the central processing unit during the second central processing unit write operation;

(k) sending an exclusive modified version of a first sequence of N data words directly from the cache memory to the graphics subsystem via the bus without sending the exclusive modified version of the first sequence of N data words to the central processing unit that initiated the special transfer operation if the cache memory has the exclusive modified version of the first sequence of N data words, wherein N is an integer greater than one and less than or equal to the word count, and wherein one of the data words of the first sequence of N data words resides at the starting address;

(l) sending a most recent version of the first sequence of N data words directly from the main memory to the graphics subsystem via the bus without sending the most recent version of the first sequence of N data words to the central processing unit that initiated the special transfer operation if the main memory has the most recent version of the first sequence of N data words and if the cache memory does not have the exclusive modified version of the first sequence of N data words;

(m) performing the third central processing unit write operation to send the ending address from the central processing unit to the decoding circuitry and clearing the ending address trigger bit, wherein both the main memory and the cache memory are not modified during the third central processing unit write operation:

(n) comparing the tag bit with a bit of the ending address having the same order as the tag bit, wherein the block of data is only contained in the first sequence of N data words if the tag bit is the same as the bit of the ending address, wherein the block of data is contained in the first sequence of N data words and a second sequence of N data words if the tag bit is not the same as the bit of the ending address, wherein if the two bits are not the same, then (1) sending the ending address from the decoding circuitry to the cache memory and to the bus;

(2) sending the ending address from the bus to the main memory and to the graphics subsystem;

(3) sending the data comprising the word count and the graphics command to the cache memory and to the bus from the central processing unit;

(4) sending the data comprising the word count and the graphics command from the bus to the graphics subsystem;

(5) sending an exclusive modified version of the second sequence of N data words directly from the cache memory to the graphics subsystem via the bus without sending the exclusive modified version of the second sequence of N data words to the central processing unit that initiated the special transfer operation if the cache memory has the exclusive modified version of the second sequence of N data words, wherein one of the data words of the second sequence of N data words resides at the ending address;

(6) sending a most recent version of the second sequence of N data words directly from the main memory to the graphics subsystem via the bus without sending the most recent version of the second sequence of N data words to the central processing unit that initiated the special transfer operation if the main memory has the most recent version of the second sequence of N data words and if the cache memory does not have the exclusive modified version of the second sequence of N data words.

5. The method of claim 4 for performing a write-initialed special transfer of digital information, wherein during an interrupt, an operating system of the digital computer reads the starting address trigger bit, the ending address trigger bit, and the tag bit in order to restore the digital computer after the interrupt to a state the computer was in just prior to the interrupt.

6. In a digital computer that includes a central processing unit, decoding circuitry coupled to the central processing unit, a cache memory coupled to the decoding circuitry, a bus coupled to the cache memory, a main memory coupled to the bus, and a graphics subsystem coupled to the bus, a computer implemented method for performing a write-initiated special transfer operation of digital information, wherein the digital information is transferred to the graphics subsystem during the special transfer operation, wherein the digital information includes a starting address and a block of data, wherein (1) the first starting address is an address of a first word in the block of data, (2) an ending address is an address of a last word in the block of data, and (3) a word count represents the number of words in the block of data, comprising the steps of:

(a) initiating the special transfer operation by performing a first central processing unit write operation to send a trigger address from the central processing unit to the decoding circuitry, wherein the trigger address is written into the decoding circuitry during the first central processing unit write operation;

(b) decoding the trigger address and inhibiting (1) a second central processing unit write operation subsequent to the first central processing unit write operation and (2) a third central processing unit write operation subsequent to the second central processing unit write operation from modifying the main memory and the cache memory;

(c) performing the second central processing unit write operation to send the first starting address from the central processing unit to the decoding circuitry;

(d) saving a bit of the first starting address as a tag bit, wherein the tag bit has an order that represents the position of the tag bit within the starting address;

(e) sending the first starting address from the decoding circuitry to the cache memory and to the bus;

(f) sending the first starting address from the bus to the main memory and to the graphics subsystem;

(g) sending data comprising the word count and a graphics command to the cache memory and to the bus from the central processing unit during the second central processing unit write operation;

(h) sending the data comprising the word count and the graphics command from the bus to the graphics subsystem;

(i) sending an exclusive modified version of a first sequence of N data words directly from the cache memory to the graphics subsystem via the bus without sending the exclusive modified version of the first sequence of N data words to the central processing unit that initiated the special transfer operation if the cache memory has the exclusive modified version of the first sequence of N data words, wherein N is an integer greater than one and less than or equal to the word count, and wherein one of the data words of the first sequence of N data words resides at the first starting address;

(j) sending a most recent version of the first sequence of N data words directly from the main memory to the graphics subsystem via the bus without sending the most recent version of the first sequence of N data words to the central processing unit that initiated the special transfer operation if the main memory has the most recent version of the first sequence of N data words and if the cache memory does not have the exclusive modified version of the first sequence of the N data words;

(k) dividing the word count by N, subtracting one, and, if there is any fraction in the result, rounding the result to the next greatest integer to produce an integer X, and if X is a positive integer other than zero, then repeating steps (a) through (j) X minus one times, wherein before each repetition of steps (a) through (j), (1) incrementing the first starting address by N;
(2) clearing the tag bit; and
(3) causing a next sequence of N data words out of a successive series of sequences of N data words to become the first sequence of N data words, the successive series being run through as steps (a) through (j) are repeated;

(l) performing the third central processing unit write operation to send the ending address from the central processing unit to the decoding circuitry;

(m) comparing the tag bit with a bit of the ending address having the same order as the tag bit, wherein transfer of the block of data is complete if the tag bit is the same as the bit of the ending address, wherein the block of data is not complete and a second sequence of N data words is to be transferred if the tag bit is not the same as the bit of the ending address, wherein if the two bits are not the same, then (1) sending the ending address from the decoding circuitry to the cache memory and to the bus;
(2) sending the ending address from the bus to the main memory and to the graphics subsystem;

(3) sending the data comprising the word count and the graphics command to the cache memory and to the bus from the central processing unit;
(4) sending the data comprising the word count and the graphics command from the bus to the graphics subsystem;
(5) sending an exclusive modified version of the second sequence of N data words directly from the cache memory to the graphics subsystem via the bus without sending the exclusive modified version of the second sequence of N data words to the central processing unit that initiated the special transfer operation if the cache memory has the exclusive modified version of the second sequence of N data words, wherein one of the data words of the sequence of N data words resides at the ending address;
(6) sending a most recent version of the second sequence of N data words directly from the main memory to the graphics subsystem via the bus without sending the most recent version of the second sequence of N data words to the central processing unit that initiated the special transfer operation if the main memory has the most recent version of the second sequence of N data words and if the cache memory does not have the exclusive modified version of the second sequence of N data words.

* * * * *